United States Patent
Tamura et al.

(10) Patent No.: US 10,021,664 B2
(45) Date of Patent: Jul. 10, 2018

(54) METHOD FOR MOBILE COMMUNICATION SYSTEM, MOBILE COMMUNICATION SYSTEM, MOBILE TERMINAL, NETWORK NODE, AND PGW

(71) Applicant: NEC Corporation, Tokyo (JP)

(72) Inventors: Toshiyuki Tamura, Tokyo (JP); Junya Okabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/310,030

(22) PCT Filed: May 7, 2015

(86) PCT No.: PCT/JP2015/002328
§ 371 (c)(1),
(2) Date: Nov. 9, 2016

(87) PCT Pub. No.: WO2015/174045
PCT Pub. Date: Nov. 19, 2015

(65) Prior Publication Data
US 2017/0150467 A1   May 25, 2017

(30) Foreign Application Priority Data
May 12, 2014   (JP) .................................. 2014-098247

(51) Int. Cl.
*H04W 4/00*   (2018.01)
*H04W 60/00*   (2009.01)
(Continued)

(52) U.S. Cl.
CPC ............. *H04W 60/00* (2013.01); *H04W 8/06* (2013.01); *H04W 48/14* (2013.01); *H04W 64/00* (2013.01);
(Continued)

(58) Field of Classification Search
CPC ....... H04W 60/00; H04W 8/06; H04W 48/14; H04W 64/00; H04W 68/02; H04W 88/02;
(Continued)

(56) References Cited

U.S. PATENT DOCUMENTS

2011/0026463 A1   2/2011 Lair
2012/0189016 A1   7/2012 Bakker et al.
(Continued)

FOREIGN PATENT DOCUMENTS

JP   2011-515879 A   5/2011
JP   2014-506747 A   3/2014
(Continued)

OTHER PUBLICATIONS

International Search Report, Corresponding to PCT/JP2015/002328, dated Aug. 4, 2015, 2 pp.
(Continued)

*Primary Examiner* — Barry W Taylor
(74) *Attorney, Agent, or Firm* — Wilmer Cutler Pickering Hale and Dorr LLP

(57) ABSTRACT

A communication system according to an exemplary embodiment of the invention includes an MME (25) that, by movement of a UE (45), performs Tracking Area Update processing that changes a location registration area of the UE (45) and manages the location registration area of the UE (45) before change, and a PGW (75) that sends, to the MME (25), a control signal required to be notified to the UE (45) during execution of the Tracking Area Update processing. When the MME (25) receives the control signal, it sends a response signal indicating that the Tracking Area Update processing is being executed to the PGW (75), and, after completion of the Tracking Area Update processing, the
(Continued)

PGW (75) sends the control signal to an MME (35) that manages the location registration area of the UE (45) after change.

12 Claims, 8 Drawing Sheets

(51) Int. Cl.
  *H04W 8/06* (2009.01)
  *H04W 64/00* (2009.01)
  *H04W 68/02* (2009.01)
  *H04W 48/14* (2009.01)
  *H04W 88/02* (2009.01)
  *H04W 88/16* (2009.01)
  *H04W 36/00* (2009.01)
  *H04W 68/00* (2009.01)

(52) U.S. Cl.
  CPC ........ *H04W 68/02* (2013.01); *H04W 36/0005* (2013.01); *H04W 68/005* (2013.01); *H04W 88/02* (2013.01); *H04W 88/16* (2013.01)

(58) Field of Classification Search
  CPC ............................ H04W 88/16; H04W 68/005; H04W 36/0005
  See application file for complete search history.

(56) References Cited

U.S. PATENT DOCUMENTS

| | | | |
|---|---|---|---|
| 2014/0050199 A1* | 2/2014 | Chen ..................... | H04W 24/04 370/331 |
| 2015/0237592 A1* | 8/2015 | Kim ..................... | H04W 60/04 455/435.1 |
| 2016/0112896 A1* | 4/2016 | Karampatsis ..... | H04W 28/0252 370/230.1 |

FOREIGN PATENT DOCUMENTS

| | | |
|---|---|---|
| JP | 5606603 B1 | 10/2014 |
| WO | WO-2009/116409 A1 | 9/2009 |
| WO | WO-2012/100199 A2 | 7/2012 |
| WO | WO-2014/0188673 A1 | 11/2014 |

OTHER PUBLICATIONS

3GPP TS 23.401 V12.0.0 (Mar. 2013), 3rd Generation Partnership Project; Technical Specification Group Services and System Aspects; General Packet Radio Service (GPRS enhancements for Evolved Universal Terrestrial Radio Access Network (E-UTRAN) access (Release 12), Mar. 2013, 289 pp.

3GPP TSG-SA WG2#99 S20133739, "Fix downlink packet delivery failure due to crash with mobility event," NEC, Sep. 23, 2013, 6 pp.

3GPP TSG-SA WG2 #103, S2-141634, "Correction to the MME initiated bearer setup during the TAU procedure," NEC, May 13, 2014, 30 pages.

Japanese Decision to Grant a Patent issued in Japanese Patent Application No. 2014-098247, dated Feb. 6, 2018, 6 pages.

Huawei "Clean up the FFS on Subscription Data Handling During TAU and Other Procedures", 3GPP TSG SA WG2 Architecture—#60b—SAE drafting ad-hoc, S2-074829, Warsaw, Poland, Nov. 7-9, 2007, pp. 1-20 (20 sheets).

* cited by examiner

METHOD FOR MOBILE COMMUNICATION SYSTEM, MOBILE COMMUNICATION SYSTEM, MOBILE TERMINAL, NETWORK NODE, AND PGW

CROSS-REFERENCE TO RELATED APPLICATIONS

The present application is a national stage application of International Application No. PCT/JP2015/002328 entitled "METHOD FOR MOBILE COMMUNICATION SYSTEM, MOBILE COMMUNICATION SYSTEM, MOBILE TERMINAL, NETWORK NODE, AND PGW," filed on May 7, 2015, which claims the benefit of priority from Japanese Patent Application No. JP2014-098247, filed on May 12, 2014, the disclosures of which are incorporated herein in their entirety by reference thereto.

TECHNICAL FIELD

The present invention relates to a communication system, an MME and a communication method and, for example, relates to a communication system, an MME and a communication method that perform call control for an UE.

BACKGROUND ART

In the 3GPP (Third Generation Partnership Project) that defines a standard for mobile network systems, an EPC (Evolved Packet Core) is specified as the next generation mobile network system. The EPC is a network system that accommodates an LTE (Long Term Evolution) access network in addition to wireless access networks called the second generation and the third generation.

Incoming packet call processing in the EPC is described hereinafter. In Non-Patent Literature 1, incoming packet call processing in the case where a UE (User Equipment) representing a user terminal is in the idle mode is disclosed. The state where the UE is in the idle mode is the state where the UE is not connected with the EPC. In other words, a radio bearer between the UE and the EPC is disconnected in this state. In such a case, when an incoming packet call is made to the UE, an SGW (Serving Gateway), which is a bearer management device, sends an incoming call notification message to an MME (Mobility Management Entity) or an SGSN (Serving GPRS Support Node) that manages the UE. Receiving the incoming call notification message, the MME or SGSN sends a Paging message to an eNB (evolved Node B) or a NodeB, which is a base station, in order to call the UE. Receiving the Paging message, the eNB or NodeB performs Page processing on a plurality of UEs located in the area managed by itself. The UE to be called sends a response message to the eNB or NodeB and connects to the EPC.

In this manner, even when an incoming packet call is made to the UE in the idle mode which is not connected with the EPC, it is possible to perform data communication with the UE by calling the UE from the network side.

CITATION LIST

Non Patent Literature

[NPL1] 3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.0.0 (2013-03), clauses 5.3.4.3, 5.3.3.2

SUMMARY OF INVENTION

Technical Problem

However, in the incoming packet call processing disclosed in Non Patent Literature 1, the following problem occurs. Normally, when the UE moves out of a location registration area managed by the MME, the UE sends a location registration request (Tracking Area Update Request) message to a new MME that manages a location registration area to which the UE is to move. Receiving the location registration request message, the new MME performs location registration of the UE. After the location registration in the new MME is done, the UE becomes the state where it is registered in the new MME that manages the location registration area to which it is to move.

When an incoming packet call arrives to the UE after the UE sends the location registration request message and before processing for movement is done in the new MME, the problem that it is not possible to normally call the UE to be called occurs.

For example, when an incoming packet call arrives to the UE after the UE sends the location registration request message and before processing for movement is done in the new MME, the SGW sends the incoming call notification message to the MME that has managed the location of the UE before movement. Receiving the incoming call notification message, the MME sends a Paging message to a base station under its control; however, because the UE to be called has moved out to the area managed by the new MME, it is not possible to call the UE. In other words, when an incoming packet call is made while the UE is during its movement which involves a change in the MME, the problem that the UE cannot receive the incoming packet occurs.

Alternatively, when, after the UE sends the location registration request message, the SGW recognizes a new MME to manage the location of the UE after movement, the SGW sends the incoming call notification message to the new MME. In this case also, when the UE has not received a response message to the Tracking Area Update Request message, and Tracking Area Update processing is not done, the problem that the UE cannot normally receive the incoming packet occurs.

An exemplary object of the present invention is to provide a communication system, an MME and a communication method that perform control so as to reliably receive an incoming packet call that is made during movement of a UE.

Solution to Problem

A communication system according to a first exemplary aspect of the invention includes an MME that, by movement of a UE, performs Tracking Area Update processing that changes a location registration area of the UE and manages the location registration area of the UE before change, and a PGW that sends, to the MME, a control signal required to be notified to the UE during execution of the Tracking Area Update processing, wherein the MME receives the control signal, and sends a response signal indicating that the Tracking Area Update processing is being executed to the PGW, and, after completion of the Tracking Area Update processing, the PGW sends the control signal to an MME that manages the location registration area of the UE after change.

An MME according to a second exemplary aspect of the invention is an MME that, by movement of a UE, performs Tracking Area Update processing that changes a location registration area of the UE and manages the location registration area of the UE before change, wherein the MME receives a control signal sent from a PGW and required to be notified to the UE during execution of the Tracking Area Update processing, and in response to receiving the control signal, sends a response signal indicating that the Tracking Area Update processing is being executed to the PGW, and, after completion of the Tracking Area Update processing, causes the PGW to send the control signal to an MME that manages the location registration area of the UE after change.

A communication method according to a third exemplary aspect of the invention is a communication method in an MME that, by movement of a UE, performs Tracking Area Update processing that changes a location registration area of the UE and manages the location registration area of the UE before change, the method including receiving a control signal sent from a PGW and required to be notified to the UE during execution of the Tracking Area Update processing, in response to receiving the control signal, sending a response signal indicating that the Tracking Area Update processing is being executed to the PGW, and after completion of the Tracking Area Update processing, causing the PGW to send the control signal to an MME that manages the location registration area of the UE after change.

Advantageous Effects of Invention

According to an exemplary embodiment of the invention, it is possible to provide a communication system, an MME and a communication method that perform control so as to reliably receive an incoming packet call that is made during movement of a UE.

DESCRIPTION OF EMBODIMENTS

First Exemplary Embodiment

Figure 1:
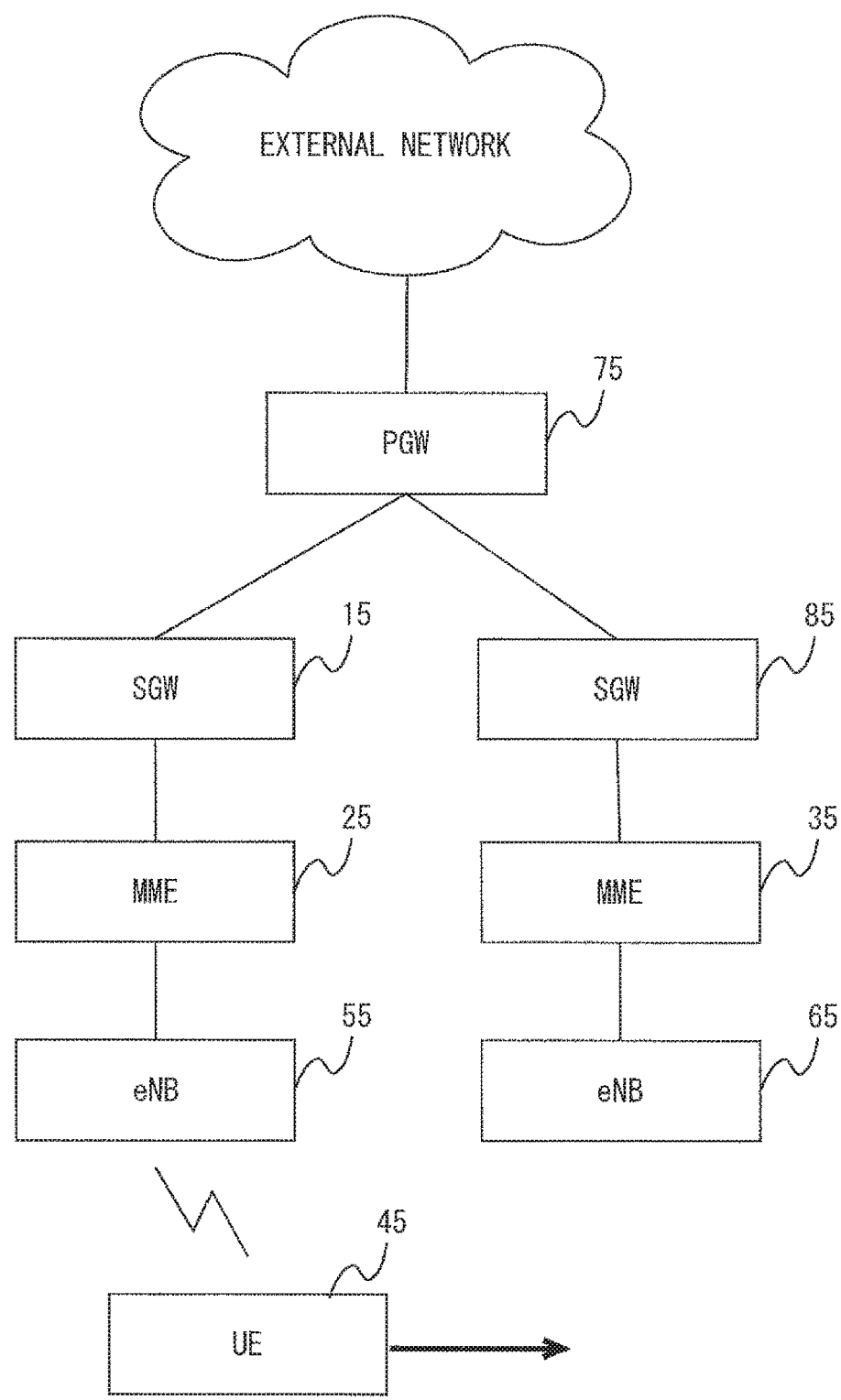
FIG. 1 is a configuration diagram of a communication system according to first, second and third exemplary embodiments.

Exemplary embodiments of the present invention are described hereinafter with reference to the drawings. A configuration example of a communication system according to a first exemplary embodiment of the present invention is described hereinafter with reference to FIG. 1. In this figure, a mobile communication system that is defined in the 3GPP is described. The communication system in FIG. 1 includes a PGW (Packet Data Network GateWay) 75, an old SGW (Serving GateWay) 15, a new SGW 85, an old MME 25, a new MME 35, a UE 45, an eNB 55 and an eNB 65.

The UE 45 is a communication device that is specified as a mobile terminal device in the 3GPP. The UE 45 may be a cellular phone, a smartphone, a tablet terminal, a personal computer with a communication function or the like, for example. Further, the UE 45 may be an M2M (Machine To Machine) device that performs communications in an autonomous manner. The M2M device may be a device that does not often move such as an automatic vending machine or an electrical appliance having a communication function, or a watch worn by a user and the like, for example.

The eNB 55 and eNB 65 are node devices specified as base stations in the 3GPP. Each of the eNB 55 and eNB 65 forms a wireless communication area and communicates with the UE that is located in the wireless communication area managed by itself.

The PGW 75 is a node device that is located at the boundary between the mobile communication system and the external network. The PGW 75 sends a PGW 75 activation control signal to the old MME 25 or the new MME 35. The PGW 75 activation control signal is a control signal that is generated in the PGW 75 and that needs to be notified to the UE 45.

Each of the old MME 25 and the new MME 35 defines a location registration area that manages the location of the UE. In the location registration area managed by each of the old MME 25 and the new MME 35, a plurality of eNB may be located. In other words, the location registration area may include a plurality of wireless communication areas formed by the eNB.

When the UE 45 moves from the location registration area defined by the old MME 25 to the location registration area defined by the new MME 35, the UE 45 sends a location registration request message to the new MME 35. Receiving the location registration request message sent from the UE 45, the new MME 35 performs processing for movement of the UE 45. The processing for movement of the UE 45 is processing that the new MME 35 registers the UE 45 as a device to be managed, for example. Further, when the new MME 35 receives the location registration request message sent from the UE 45, it sends a message to the old MME 25. The old MME 25 is an MME that manages the location registration area from which the UE 45 moves. The message that is notified from the new MME 35 to the old MME 25 is a message indicating that the UE 45 has moved to the location registration area defined by the new MME 35. The UE 45 may add an identifier of the old MME 25 that manages the location registration area before movement to the location registration request message for the new MME 35. The new MME 35 can thereby detect the old MME 25 that manages the location registration area from which the UE 45 moves. The old MME 25 receives the message from the new MME 35 and can thereby detect that the UE 45 has moved to the location registration area defined by the new MME 35.

Although the case where the MME that manages the location registration area of the UE 45 is changed is described in this figure, there is also case where the UE 45 moves from an LTE communication to a 2G or 3G communication area. In this case, the node device that manages the location registration area of the UE 45 is changed from the MME to the SGSN. When the UE 45 moves to a 2G or 3G communication area, the UE 45 connects to a NodeB and an RNC (Radio Network Controller). Further, there is a case where the UE 45 moves from a 2G or 3G communication area to a 2G or 3G communication area. In this case, the SGSN that manages the location registration area of the UE 45 is changed in some cases.

Figure 2:
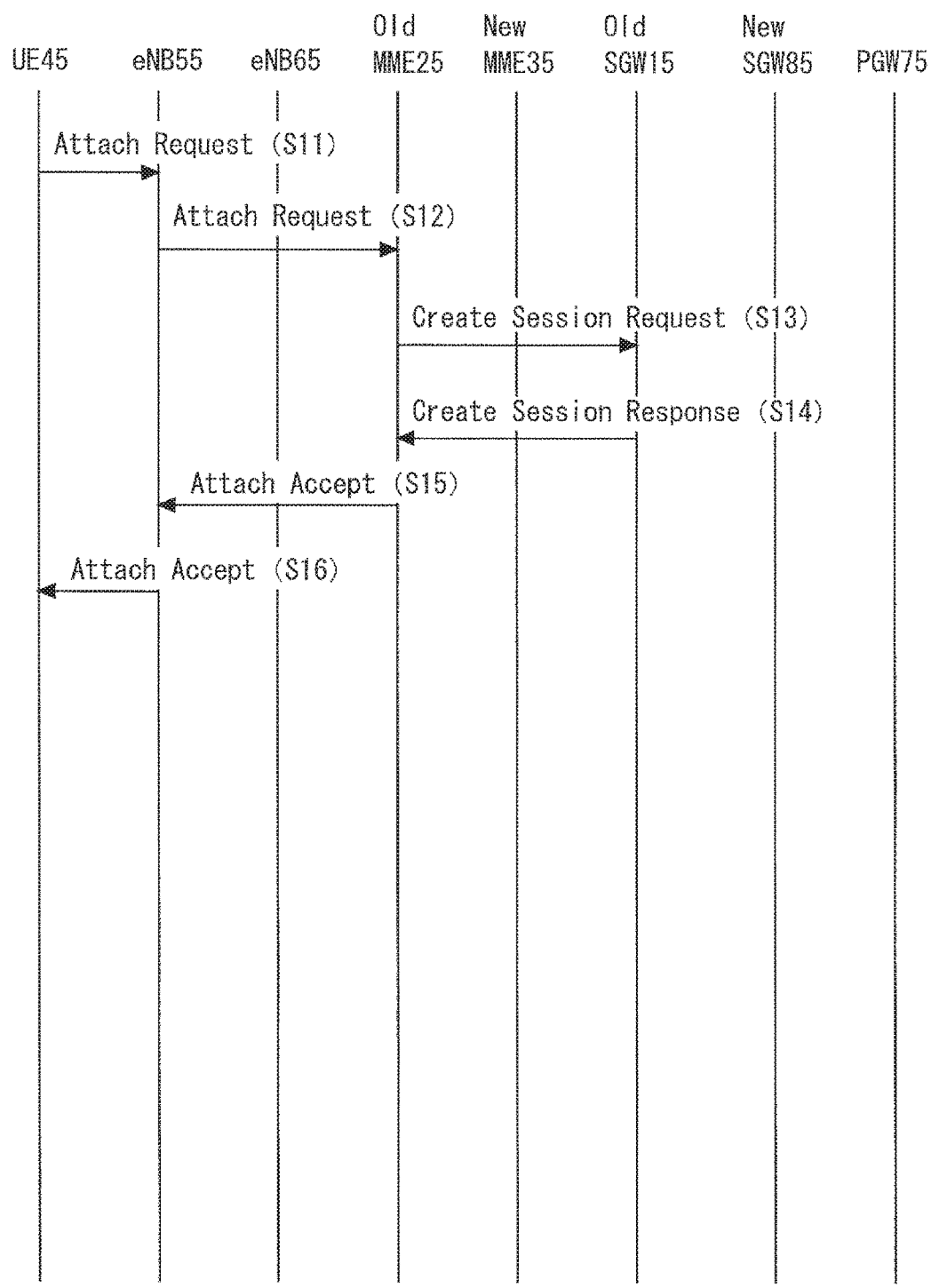
FIG. 2 is a view showing a flow of processing to connect a UE to a mobile communication system according to the first, second and third exemplary embodiments.

Hereinafter, a flow of processing to connect the UE to the mobile communication system according to the first exemplary embodiment of the invention is described with reference to FIG. 2. First, when a power switch is pressed by a user and a power is turned on, the UE 45 sends an Attach Request message as the location registration request message to the eNB 55 (S11). Next, the eNB 55 sends the Attach Request message sent from the UE 45 to the old MME 25 (S12). Receiving the Attach Request message, the old MME 25 generates location registration information of the UE 45. The location registration information contains information indicating that the UE 45 is located within the location registration area managed by its own device or subscriber information of the UE 45, for example. The subscriber information of the UE 45 may be acquired from a subscriber information management device (not shown) that is placed in the mobile communication system. The subscriber information management device is specified as an HSS (Home Subscriber Server) in the 3GPP, for example. Then, the old MME 25 notifies the subscriber information of the UE 45 to the old SGW 15 using a Create Session Request message (S13). Then, the old SGW 15 sends a Create Session Response message to the old MME 25 as a response message to the Create Session Request message (S14). By receiving the Create Session Request message, the old SGW 15 can identify the MME that manages the location of the UE 45. Further, by the sending of the Create Session Response message, a session for the UE 45 is established between the old MME 25 and the old SGW 15.

Receiving the Create Session Response message, the old MME 25 sends an Attach Accept message to the eNB 55 (S15). The Attach Accept message corresponds to a response signal to the Attach Request message. By sending the Attach Accept message, the old MME 25 completes registration processing of the UE 45. The completion of registration processing of the UE 45 means the completion of movement processing of the UE 45. After that, the eNB 55 sends an Attach Accept message to the UE 45 (S16).

By receiving the Attach Accept message, the UE 45 becomes connected to the mobile communication system. The state where the UE 45 is connected to the mobile communication system may be referred to as the state where the UE 45 is attached to the mobile communication system.

Although the flow of processing when the power of the UE 45 is turned on is described above, the same processing is executed also when the location registration area where the UE 45 is located changes in order to generate location registration information in a new MME. When the location registration area where the UE 45 is located changes, the UE 45 sends a Tracking Area Update Request message instead of the Attach Request message. Further, the old MME 25 and the SGW 15 send and receive Modify Bearer Request/Modify Bearer Response messages instead of the Create Session Request/Create Session Response messages.

Hereinafter, a flow or processing performed when the PGW 75 according to the first exemplary embodiment of the present invention notifies a PGW 75 activation control signal to the UE 45 is described with reference to FIG. 3. In this example, it is assumed that the processing of FIG. 2 is completed, and the UE 45 is located in the location registration area managed by the old MME 25.

First, when the UE 45 detects that it has moved from the location registration area managed by the old MME 25 to another location registration area, the UE 45 sends a Tracking Area Update Request message to the eNB 65 (S21). The eNB 65 manages the location registration area to which the UE 45 has moved. The UE 45 may detect that the location registration area has changed by receiving annunciation information delivered from the eNB 65. Specifically, the UE 45 may detect that the location registration area has changed when the location registration area delivered from the eNB 55 before movement and the location registration area delivered from the eNB 65 after movement are different from each other.

Next, the eNB 65 transfers a Tracking Area Update Request message to the new MME 35 that manages the location registration area including the communication area of its own device (S22). At the same time, S1 Connection (S1 bearer) is established between the eNB 65 and the new MME 35 for communication of a control message between the UE 45 and the new MME 35. The Tracking Area Update Request message may contain the identifier of the old MME 25 that used to manage the location registration area from which the UE 45 has moved, or GUTI (Globally Unique Temporary Identifier) that is temporarily assigned to the UE 45 by the old MME 25.

Then, the new MME 35 sends a Context Request message to the old MME 25 in order to retrieve the user information of the UE 45 from the old MME 25 (S23). The user information may be the location registration information of the UE 45, bearer context and the like, for example. Further, when the Tracking Area Update Request message contains GUTI, the new MME 35 may specify the address information of the old MME 25 by using the GUTI.

The old MME 25 receives, from the new MME 35, a Context Request message requesting the transfer of the user information of the UE 45. By receiving the Context Request message sent from the new MME 35, the old MME 25 can detect that the UE 45 has moved out of the location registration area managed by itself. Further, by receiving the Context Request message sent from the new MME 35, the old MME 25 can detect that the UE 45 has moved to the location registration area managed by the new MME 35.

The old MME 25 sends a Context Response message to the new MME 35 as a response message to the Context Request message in Step S23 (S24). Using the Context Response message, the old MME 25 notifies the user information of the UE 45 to the new MME 35.

It is assumed that, after the Context Response message is sent from the old MME 25 to the new MME 35 in Step S24, a control signal notification message is sent from the PGW 75 to the old MME 25 via the old SGW 15 (S25). The control signal notification message is used to notify the PGW 75 activation control signal to the MME.

The old MME 25 has detected that the UE 45 is during its movement by receiving the Context Request message in Step S23. Therefore, the old MME 25 sends, to the PGW 75, a response signal notification message to which Cause indicating that the UE 45 is moving and a call attempt to the UE 45 is temporarily unavailable is set. The old MME 25 sends the response signal notification message to the PGW 75 via the old SGW 15 as a response to the control signal notification message (S26). To the response signal notification message, "Cause=Temporarily Rejected due to mobility procedure in Progress" is set as Cause setting. "Cause=Temporarily Rejected due to mobility procedure in Progress" indicates that information indicating that the UE is moving and a call attempt is temporarily rejected is set to Cause.

Receiving response signal notification message to which "Cause=Temporarily Rejected due to mobility procedure in Progress" is set, the PGW 75 starts a locally configured guard timer for resending the control signal notification message.

Then, the new MME 35 sends a Context Acknowledge message to the old MME 25 as a response message to the Context Response message (S27). SGW change indication is set to the Context Acknowledge message. SGW change indication is information indicating that the new MME 35 has changed the SGW for sending data to the UE 45 from the to old MME 25 to the new MME 35.

Then, the new MME 35 sends a Create Session Request message to the new SGW 85 in order to establish a session with the new SGW 85 or to activate a bearer. The new SGW 85 then sends a Modify Bearer Request message to the PGW 75 in order to establish or update a session or a bearer with the PGW 75 (S29). By receiving the Modify Bearer Request message, the PGW 75 can recognize that mobility procedure for the UE 45 has completed in the new MME 35. The PGW 75 updates the bearer context between the new SGW 85 and the PGW 75. Further, the PGW 75 sends a Modify Bearer Response message to the new SGW 85 as a response message to the Modify Bearer Request message (S30). At this time, the PGW 75 may stop the locally configured guard timer started when receiving the response signal notification message in Step S26.

Then, the new SGW 85 updates the bearer context between the new MME 35 and the new SGW 85. Further, the new SGW 85 sends a Create Session Response message to the new MME 35 as a response message to the Create Session Request message (S31).

The old MME 25 and the new MME 35 perform location information change processing A for the movement of the UE 45. The details of the location information change processing A are described later.

When the location information update processing A ends, the new MME 35 sends a Tracking Area Update Accept message to the eNB 65 as a response message in Step S22. Further, the eNB 65 sends the sent Tracking Area Update Accept message to the UE 45 (S32).

The Tracking Area Update Accept message contains GUTI assigned to the UE 45 by the new MME 35. The GUTI is an identifier that is temporarily assigned to the UE by the new MME 35 in order to uniquely identify the UE.

When the Tracking Area Update Accept message contains GUTI, the UE 45 sends a Tracking Area Update Complete message to the new MME 35 (S33).

After that, the new MME 35 releases the S1 Connection that has been established between the eNB 65 and the MME 35 (S34).

Then, the PGW 75 sends a control signal notification message to the new MME 35 that manages the location registration area to which the UE 45 moves in order to notify a control signal to the UE 45 (S35). Thus, in Step S35, the processing of sending the control signal notification message to the old MME 25 in Step S25 is performed for the new MME 35 that manages the location registration area to which the UE 45 moves. Then, the new MME 35 sends a Paging message to the eNB 65 in order to perform a call attempt to the UE 45 (S36). Further, the eNB 65 sends a Paging message to the UE located in the communication area under its control (S37). When sending the Paging message, the new MME 35 sets GUTI assigned to the UE 45. In this manner, after moving to a new location registration area, the UE 45 can receive the control signal notification message that has been made during the movement of the UE 45.

In the case where the locally configured guard timer that is started when the response signal notification message is received in Step S26 expires before receiving the Modify Bearer Request message, the PGW 75 may end the control message notification processing to the UE 45. Alternatively, the PGW 75 may send the control signal notification message to the old MME 25 again to continue the control signal notification processing.

The location information update processing A is described hereinafter in detail with reference to FIG. 4. When the new MME 35 receives the Create Session Response message in Step S31 of FIG. 3, it sends an Update Location message to the HSS (S201). The HSS is a node device that manages subscriber information of the UE 45. To the Create Session Response, information indicating that the new MME 35 manages the location information about the UE 45 is set.

Then, the HSS sends a Cancel Location message to the old MME 25 so as to delete the location information about the UE 45 (S202). As a response message to the Cancel Location message, the old MME 25 sends a Cancel Location ACK message to the HSS (S203). The HSS then sends an Update Location ACK message to the new MME 35 as a response to the Update Location message in Step S201 (S204).

Further, after sending the Cancel Location ACK message, the old MME 25 sends a Delete Session Request message to the old SGW 15 (S205). By sending the Delete Session Request message, the old MME 25 releases the communication resource (e.g. EPS bearer resource etc.) with the old SGW 15. As a response message to the Delete Session Request message, the old SGW 15 sends a Delete Session Response message to the old SGW 15 (S206).

As described above, with use of the communication system according to the first exemplary embodiment of the present invention, the following effects can be obtained. Even when the PGW 75 activation control signal is made to the UE 45 while the UE 45 is during its movement which involves a change in the MME and the processing for movement of the UE 45 is not completed in a new MME, the UE 45 can normally receive the control signal.

Further, in the case where the old MME 25 and the new MME 35 are replaced by the SGSN and the eNB 55 and the eNB 65 are replaced by the RNC, the Tracking Area Update Request message in Steps S21 and S22 is replaced by a Routing Area Update Request message. Further, the Tracking Area Update Accept message in Steps S32 and S2 is replaced by a Routing Area Update Accept message.

Although the flow of processing when the control signal notification message is sent to the old MME 25 after Step S24 is shown in the figure, the same processing as in this figure is performed also when the control signal notification message is sent to the old MME 25 during a period after Step S23 and before Step S29.

Further, specific examples of the PGW 75 activation control signal sent from the PGW 75 are EPC(LTE):Create Bearer Request, EPC(LTE):Update Bearer Request, EPC(LTE):Delete Bearer Request, GPRS(2G/3G):Update PDP Context Request, GPRS(2G/3G):PDU Notification Request, GPRS(2G/3G):Delete PDP Context Request, and GPRS(2G/3G):Initiate PDP Context Activation Request.

Second Exemplary Embodiment

A processing sequence in a communication system according to a second exemplary embodiment of the present invention is described hereinafter with reference to FIG. 5. Processing when an incoming packet call is made to the new MME 35 that manages the location information of the UE 45 after movement is shown in this figure. It is assumed that the MME change processing for the movement of the UE 45 is not completed when the new MME 35 receives a message related to an incoming packet call or a PGW 75 activation control signal. To be specific, it is assumed that the UE 45 does not receive a response message to the Tracking Update Request message when the new MME 35 receives a message related to an incoming packet call or a PGW 75 activation control signal.

Figure 3:
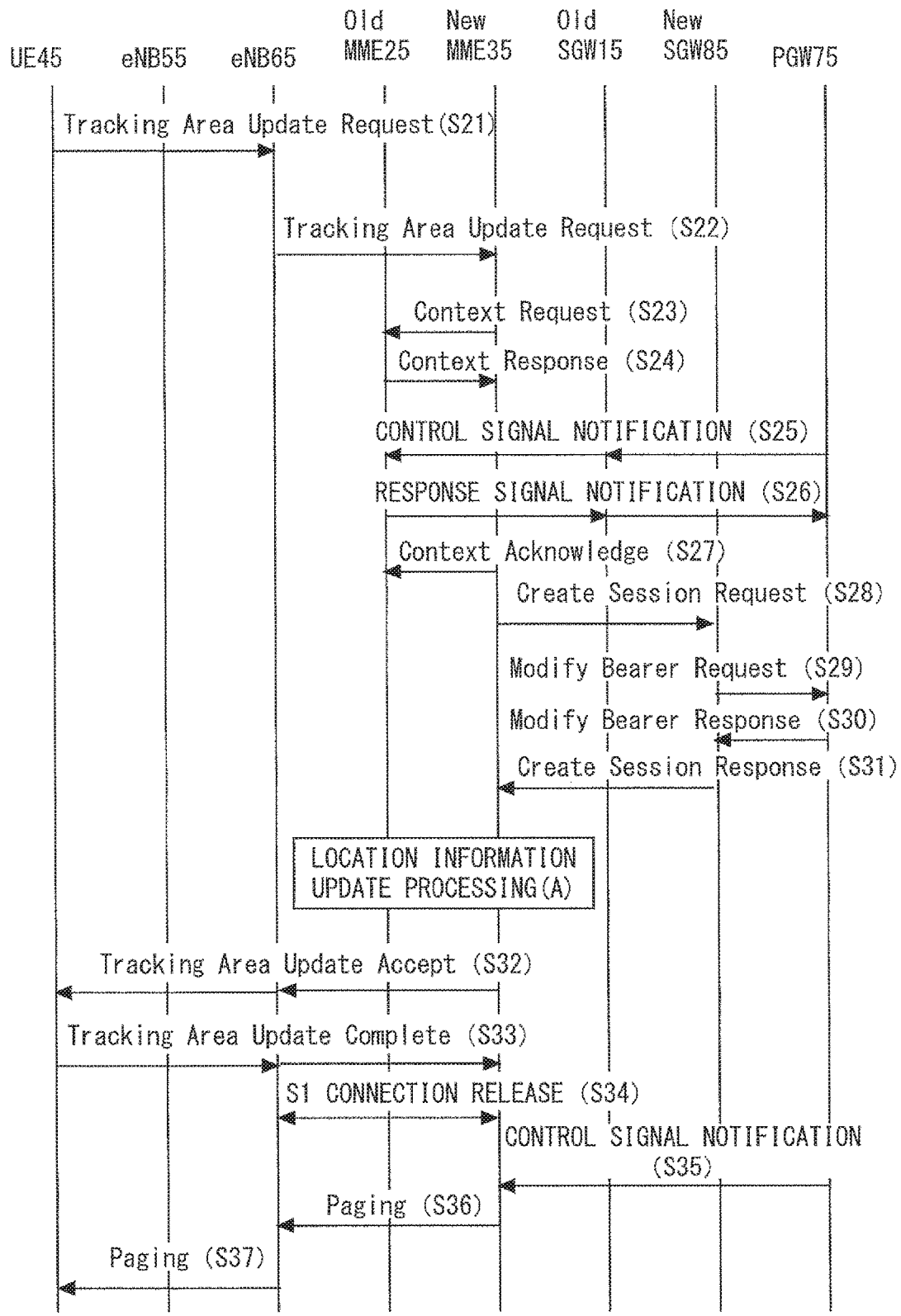
FIG. 3 is a view showing a flow of processing when notifying a PGW activation control signal to a UE according to the first exemplary embodiment.

Steps S41 to S49 are the same as Steps S21 to S24 and Steps S27 to S31 in FIG. 3, and therefore detailed explanation thereof is omitted. Further, location information update processing A that is performed after Step S49 is the same as the location information update processing A in FIG. 3, and therefore detailed explanation thereof is omitted.

In Step S46, the new SGW 85 receives a Create Session Request message, and it recognizes that the new MME 35 is managing the user information about the UE 45. Further, in Step S47, the PGW 75 receives a Modify Bearer Request message and recognizes that the new SGW 85 is managing the session or the bearer context about the UE 45. Therefore, in Step S50, when an incoming packet call or a PGW 75 activation control signal for the UE 45 is made, the PGW 75 sends the incoming packet call or a message about the PGW 75 activation control signal to the new SGW 85.

Then, the new SGW 85 sends a Downlink Data Notification message indicating that an incoming packet call is made to the UE 45 or the PGW 75 activation control signal to the new MME 35 (S51).

Figure 4:
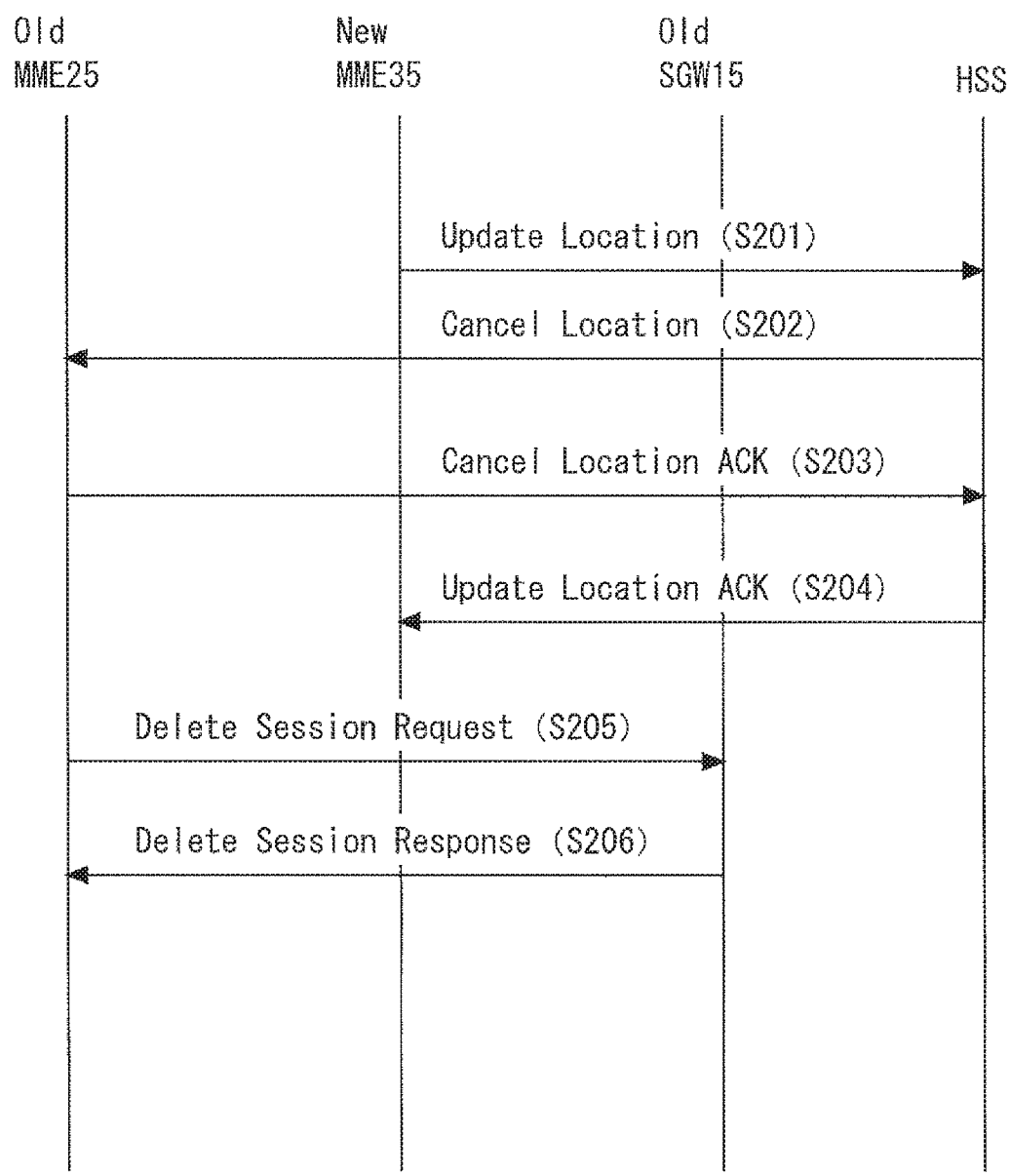
FIG. 4 is a view showing a flow of a location information update processing according to the first, second and third exemplary embodiments.

Then, when the new MME 35 receives the Update Location ACK message in Step S204 of the location information update processing A shown in FIG. 4, it sends a Tracking Area Update Accept message to the UE 45 via the eNB 65 (S52). Note that, after sending a Create Session Request message to the new SGW 85 in Step S46, the new MME 35 receives a Downlink Data Notification message that requires paging processing for the UE 45. In this case, a user plane setup procedure is activated in conjunction with a Tracking Area Update Accept message. When, in Steps S41 and S42, an active flag is set, and even when an active flag is not set, the user plane setup procedure is activated.

The user plane setup procedure in conjunction with a Tracking Area Update Accept message is described hereinafter. The new MME 35 sends an S1-AP Initial Context Setup Request message together with the Tracking Area Update Accept message in Step S52 to the eNB 65. In other words, the new MME 35 sends the Tracking Area Update Accept message and the S1-AP Initial Context Setup Request message at the same timing to the eNB 65. Triggered by the S1-AP Initial Context Setup Request message, Radio Bearer Establishment (S54) takes place between the eNB 65 and the UE 45. To notify the newly established bearer information, the eNB 65 sends an S1 AP Initial Context Setup Response message to the new MME 35 (S56).

The new MME 35 sends a Modify Bearer request message to the new SGW 85 (S57). The new SGW 85 sends a Modify Bearer response message to the new MME 35 (S58). The user plane setup procedure is to set the communication resource for transferring data to be sent and received by the UE 45 in the eNB 65, the new SGW 85 and the PGW 75, for example.

Further, the Tracking Area Update Accept contains GUTI that is assigned to the UE 45 by the new MME 35. The GUTI is an identifier that is temporarily assigned to the UE by the new MME 35 in order to uniquely identify the UE. When the UE 45 receives the Tracking Area Update Accept message that contains the GUTI, it sends a Tracking Area Update Complete message to the new MME 35 (S55).

Steps S53 to S58 indicate that, during execution of the Tracking Area Update processing, incoming packet call processing or control signal reception processing continues using an RRC connection that is already established between the UE 45 and the new MME 35.

Further, a flow of the processing in the case where the Downlink Data Notification message is sent to the new MME 35 during execution of the Tracking Area Update processing is described in this figure. On the other hand, when the control signal notification message is sent to the new MME 35, which is described in FIG. 3, the same processing as in the case where the Downlink Data Notification message is sent to the new MME 35 is performed.

Further, a flow of the processing when an incoming packet call in Step S50 is made after Step S49 and the location information update processing A is described in this figure. Note that, however, an incoming packet call in Step S50 can be made at anytime between Step S47 to Step S52. In this case also, the same processing as described in this figure is performed.

Further, although an example of using the new MME 35 is described in this figure, an SGSN may be used instead of the new MME 35. In the figures described hereinafter also, an SGSN may be used instead of the new MME 35.

As described above, the new MME 35 adds GUTI that is temporarily assigned to the UE 45 to the Tracking Area Update Accept message and thereby notifies the GUTI to the UE 45. Therefore, the new MME 35 can perform Paging processing to the UE 45 and call the UE 45 immediately after completion of the Tracking Area Update processing.

Further, when the new MME 35 receives the Downlink Data Notification message, it activates the user plane setup procedure in conjunction with the Tracking Area Update Accept message. It is thereby possible to send Downlink Data to the UE 45. In other words, by sending the S1-AP Initial Context Setup Request message in conjunction with the Tracking Area Update Accept message to the eNB 65, it is possible to establish Radio Bearer between the UE 45 and the eNB 65 during execution of the Tracking Area Update processing. Therefore, the new MME 35 can identify the UE 45 and send data to the UE 45 without performing Page processing.

Modified Examples

Figure 5:
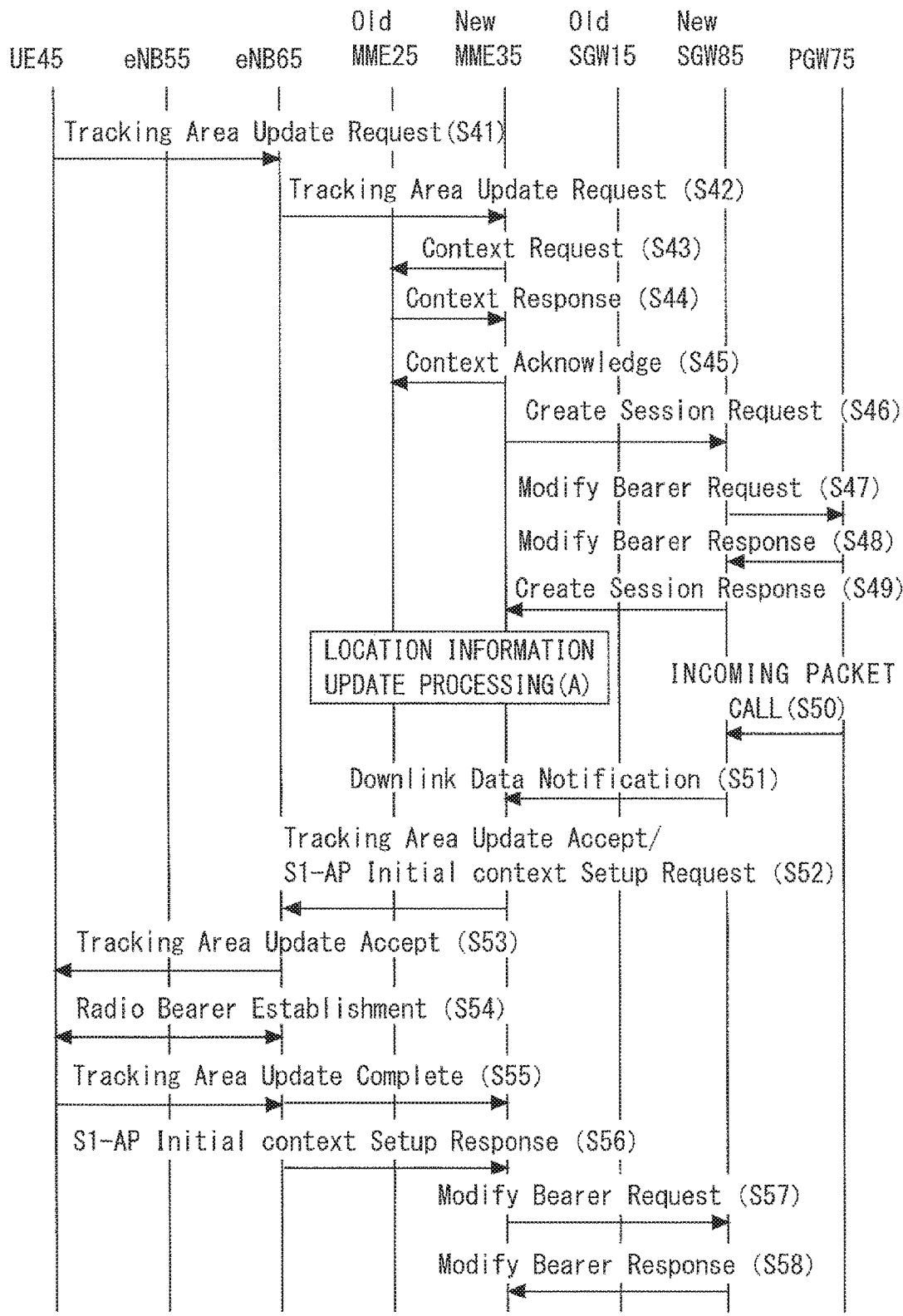
FIG. 5 is a view illustrating a processing sequence in the communication system according to the second exemplary embodiment.

Modified examples of the processing sequence of FIG. 5 are described hereinbelow. First, a processing sequence in a modified example of the processing according to the second exemplary embodiment of the invention is described with reference to FIG. 6. In this figure, a flow of the processing in the case where, when the UE 45 moves, the MME that manages the UE 45 is changed from the old MME 25 to the new MME 35 but the SGW is not changed from the old SGW 15 is described.

Steps S61 to S65 are the same as Steps S41 to S45 in FIG. 5, and therefore detailed explanation thereof is omitted. By the movement of the UE 45, the MME that manages the UE 45 has changed from the old MME 25 to the new MME 35. Therefore, the new MME 35 uses the bearer context received from the old MME 25 as the EPS (Evolved Packet System) bearer context of the UE 45. The EPS is a communication system that is specified in the 3GPP. Note that the old SGW 15 is not changed for the UE 45. Thus, to change the information about the UE 45 that is held by the old SGW 15, the new MME 35 sends a Modify Bearer Request message to the old SGW 15 in Step S66.

Steps S67 and S68 are different from Steps S47 and S48 in FIG. 5 in that the PGW 75 communicates with the old SGW 15 instead of the new SGW 85; however, messages to be sent and received are the same as those in Steps S47 and S48, and therefore detailed explanation thereof is omitted.

The old SGW 15 receives a Modify Bearer Response message in Step S68, and then updates the bearer context with the new MME 35 and sends a Modify Bearer Response to the new MME 35 (S69).

Processing after the location information update processing A is the same as processing after the location information update processing A in FIG. 5, and detailed explanation thereof is omitted. Further, Step S70 is different from Step S50 in FIG. 5 in that the PGW 75 communicates with the old SGW 15 instead of the new SGW 85. Further, Step S71 is different from Step S51 in FIG. 5 in that the new MME 35 communicates with the old SGW 15 instead of the new SGW 85. Further, Steps S77 and S78 are different from Steps S57 and S58 in FIG. 5 in that the Modify Bearer Request/Response message is sent and received between the new MME 35 and the old SGW 15. Steps S70 to S78 are the same as Steps S50 to S58 in FIG. 5 in the other points, and detailed explanation thereof is omitted.

A flow of processing in the case where the SGSN is used instead of the new MME 35 and the RNC is used instead of the eNB 65 in FIG. 5 is described hereinafter with reference to FIG. 7. Differences from FIG. 5 are mainly described below.

In Step S81, the UE 45 sends a Routing Area Update Request message, instead of the Tracking Area Update Request message in Step S41 of FIG. 5, to the RNC. Further, in Step S82, the RNC transfers the Routing Area Update Request message to the SGSN. Steps S83 to S91 are the same as Steps S43 to S51 of FIG. 5, and detailed explanation thereof is omitted.

In Step S92, the SGSN sends a Routing Area Update Accept message instead of the Tracking Area Update Accept message in Step S51 of FIG. 5. When the SGSN receives, in Step S91, a Downlink Data Notification message or a PGW 75 activation control signal that requires Paging processing to the UE 45, it sends a Routing Area Update Accept message to which a value "follow-on proceed" is set to an Update result parameter. The UE 45 receives the Routing Area Update Accept message and reuses the RRC connection that is established between the SGSN and the UE 45 without releasing it. The SGSN sets the value "follow-on proceed" to the Routing Area Update Accept message and thereby prompts the UE 45 to send a Service Request message. The UE 45 thereby sends the Service Request message to the SGSN by reusing the RRC connection that is held for the SGSN as a response to Page.

The Routing Area Update Accept message contains P-TMSI (Packet-Temporary Mobile Subscriber Identity). The P-TMSI is an identifier that is temporarily assigned to the UE 45 by the SGSN. The P-TMSI corresponds to the GUTI, which is an identifier that is temporarily assigned to the UE by the MME.

Then, the UE 45 sends a Routing Area Update Complete message to the SGSN (S93). The UE 45 then sends, to the SGSN, a Service Request message to which the P-TMSI is set (S94).

When the SGSN receives the Service Request message sent from the UE 45, it sends an RAB Assignment Request message to the RNC to request the establishment of a radio access bearer (S95). The RNC establishes the radio access bearer and sends an RAB Assignment Response message to the SGSN (S96).

A flow of processing in the case where the SGW is not changed when the UE 45 moves is described with reference to FIG. 8. Differences from FIG. 7 are mainly described.

Figure 7:
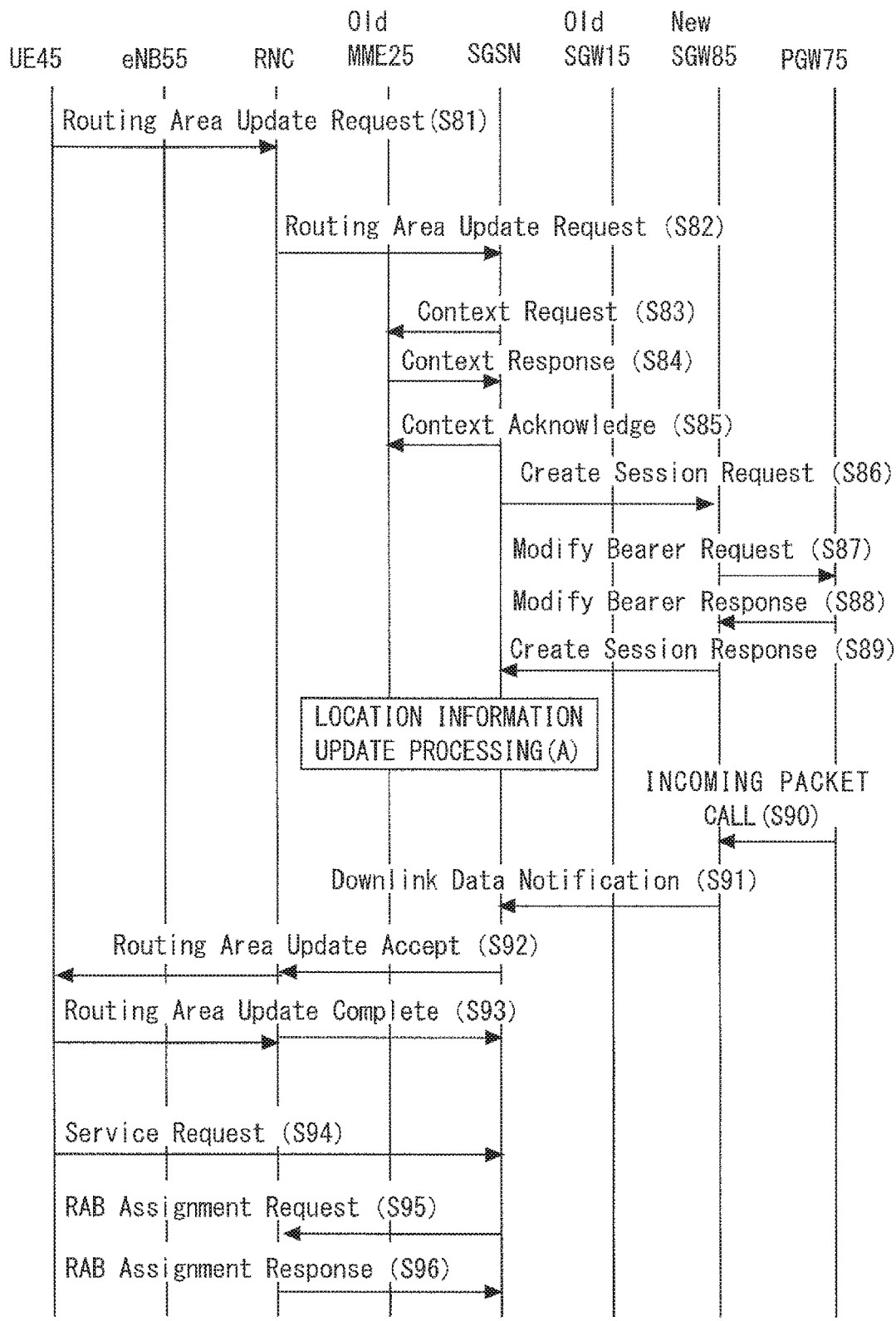
FIG. 7 is a view showing a modified example of the processing sequence in the communication system according to the second exemplary embodiment.

Steps S101 to S105 are the same as Steps S81 to S85 in FIG. 7, and detailed explanation thereof is omitted. In Step S106, the SGSN sends a Modify Bearer Request message to the old SGW 15 (S106). Steps S107 and S108 are the same as Steps S87 and S88 in FIG. 7. As a response to the Modify Bearer Request message, the old SGW 15 sends a Modify Bearer Response message to the SGSN. Processing after the location information update processing A is the same as processing after the location information update processing A in FIG. 7, and detailed explanation thereof is omitted.

Figure 6:
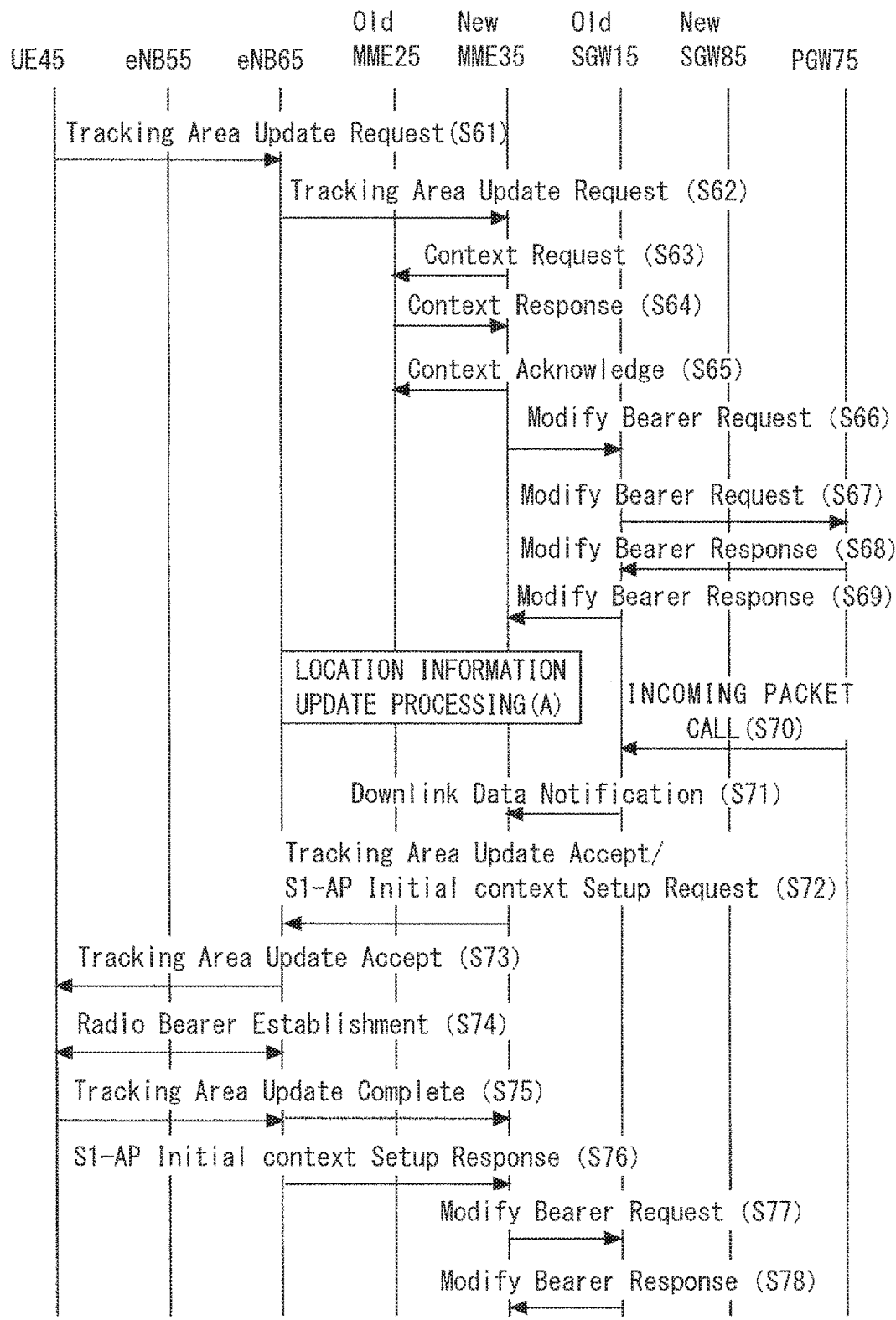
FIG. 6 is a view showing a modified example of the processing sequence in the communication system according to the second exemplary embodiment.

In FIGS. 5 and 6 described above, a processing flow in the case where, when the MME that manages the UE 45 is changed with the movement of the UE 45 from an LTE communication area to an LTE communication area, a Downlink Notification message or a PGW 75 activation control signal is sent to the new MME 35, which is the MME after change, is described. Further, in FIGS. 7 and 8, a processing flow in the case where, when the node device that manages the UE 45 is changed from the MME to the SGSN with the movement of the UE 45 from an LTE communication area to a 3G communication area, a Downlink Notification message or a PGW 75 activation control signal is sent to the SGSN is described.

In addition to the examples of movement described in FIGS. 5 to 8, there is also a case where the UE 45 moves from a 3G communication area to a 3G communication area. In this case, the node device that manages the UE 45 is changed from an old SGSN to a new SGSN in some cases. When the node device that manages the UE 45 is changed from an old SGSN to a new SGSN, an SGSN Context Request message, an SGSN Context Response message and an SGSN Context Acknowledge message are used between the old SGSN and the new SGSN, instead of the Context Request message, the Context Response message and the Context Acknowledge message in Steps S103 to S105 in FIG. 8.

Figure 8:
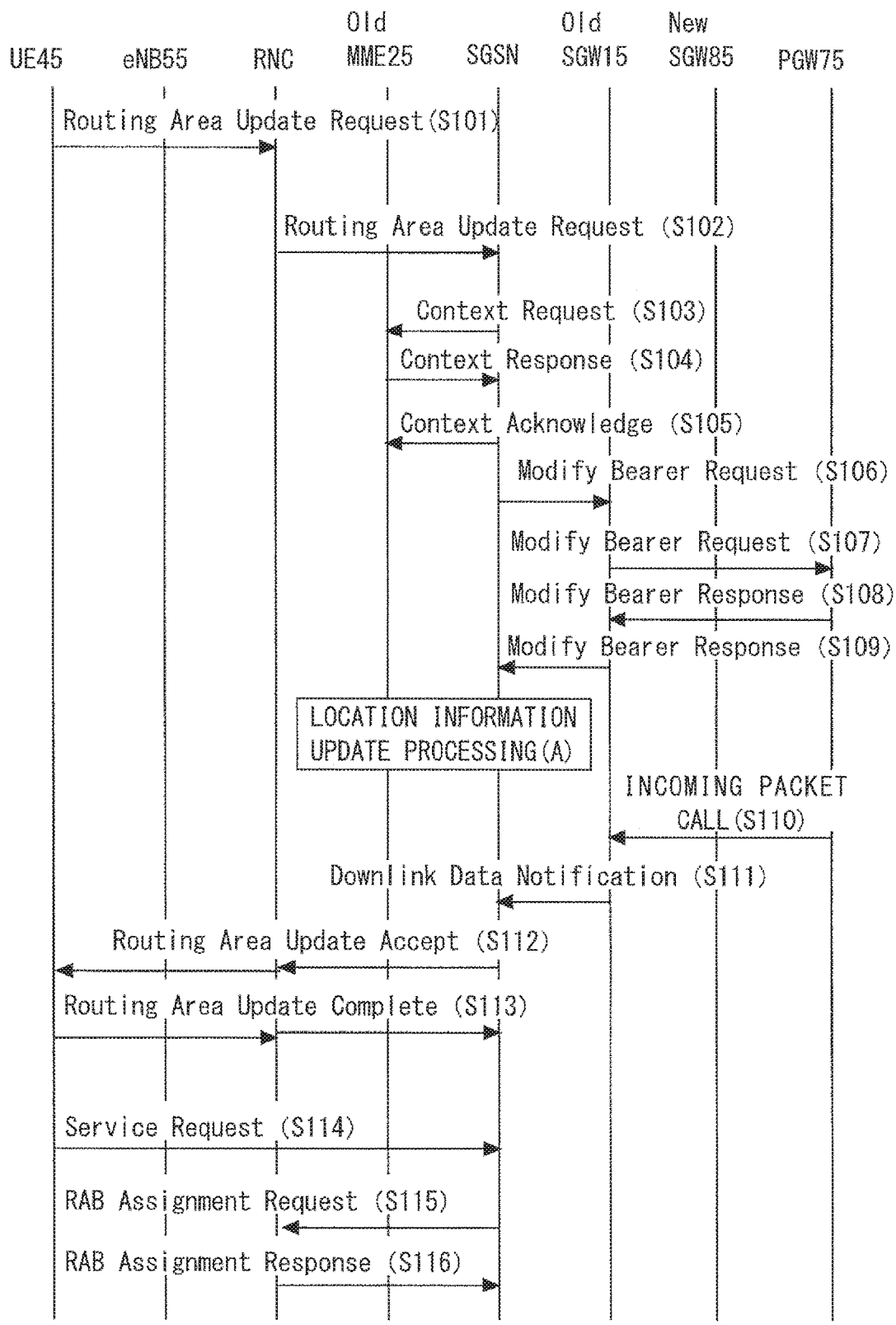
FIG. 8 is a view showing a modified example of the processing sequence in the communication system according to the second exemplary embodiment.

Further, when the node device that manages the UE 45 is changed from an old SGSN to a new SGSN, an Update PDP Context Request message is used instead of the Modify Bearer Request message in Steps S106 and S107 in FIG. 8, and an Update PDP Context Response message is used instead of the Modify Bearer Response in Steps S108 and S109 in FIG. 8, respectively between the new SGSN and a GGSN.

Further, in the case where the UE 45 moves between a 3G communication area and a 2G communication area also, the same processing as in the case where the node device that manages the UE 45 is changed from an old SGSN to a new SGSN is performed.

By performing the processing sequences described in FIGS. 5 to 8, it is possible to send data to the UE 45 even when an incoming packet call is made or a PGW 75 activation control signal is received during the Tracking Area Update processing or the Routing Area Update processing just like in FIGS. 3 and 4.

Third Exemplary Embodiment

Paging processing to the UE 45 in a communication system according to a third exemplary embodiment of the present invention is described hereinafter. In the third exemplary embodiment, when the Tracking Area Update processing or the Routing Area Update processing is done, the new MME 35 or the SGSN performs Paging processing to the UE 45

To be specific, in the processing sequences of FIGS. 5 and 6, the new MME 35 holds the Downlink Data Notification message received in Step S51 or Step S71 in a memory or the like of the device. After that, when the new MME 35 receives the Tracking Area Update Complete message in Step S53 or S73, it performs Paging processing to the UE 45 in accordance with the held Downlink Data Notification message.

Further, in the processing sequences of FIGS. 7 and 8, the SGSN holds the Downlink Data Notification message received in Step S91 or Step S111 in a memory or the like of the device. After that, when the SGSN receives the RAB Assignment Response message in Step S96 or S116, it performs Paging processing to the UE 45 in accordance with the held Downlink Data Notification message.

As described above, by performing Paging processing according to the third exemplary embodiment of the invention, it is possible to perform Paging processing to the UE 45 in accordance with the held Downlink Data Notification message without waiting for the Downlink Data Notification to be sent again. It is thereby possible to reduce the number of signals between the SGW and the MME and advance the timing to perform Paging processing to the UE 45.

Although the present invention is described as a hardware configuration in the above exemplary embodiments, the present invention is not limited thereto. The present invention may be implemented by causing a CPU (Central Processing Unit) to execute a computer program to perform the processing in each node device.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described exemplary embodiment and may be varied in many ways within the scope of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-098247 filed on May 12, 2014, the disclosure of which is incorporated herein in its entirety by reference.

For example, the whole or part of the exemplary embodiments disclosed above can be described as, but not limited to, the following supplementary notes.

(Supplementary Note 1)

A communication system including an MME that, by movement of a UE, performs Tracking Area Update processing that changes a location registration area of the UE and manages the location registration area of the UE before change, and a PGW that sends, to the MME, a control signal required to be notified to the UE during execution of the Tracking Area Update processing, wherein the MME receives the control signal, and sends a response signal indicating that the Tracking Area Update processing is being executed to the PGW, and after completion of the Tracking Area Update processing, the PGW sends the control signal to an MME that manages the location registration area of the UE after change.

(Supplementary Note 2)

A communication system including an MME that, by movement of a UE, performs Tracking Area Update processing that changes a location registration area of the UE and manages the location registration area of the UE after change, and an SGW that notifies a Downlink Data Notification message to the MME during execution of the Tracking Area Update processing, wherein the MME receives the Downlink Data Notification message, and activates a user plane setup procedure in conjunction with a Tracking Area Update Accept message to be sent to the UE.

(Supplementary Note 3)

A communication system including an MME that, by movement of a UE, performs Tracking Area Update processing that changes a location registration area of the UE and manages the location registration area of the UE after change, and an SGW that notifies a Downlink Data Notification message to the MME during execution of the Tracking Area Update processing, wherein the MME sends a Tracking Area Update Accept message to the UE after holding the Downlink Data Notification message, receives a Tracking Area Update Complete message from the UE, and then performs paging processing to the UE in accordance with the Downlink Data Notification message.

(Supplementary Note 4)

An MME that, by movement of a UE, performs Tracking Area Update processing that changes a location registration area of the UE and manages the location registration area of the UE before change, wherein the MME receives a control signal sent from a PGW and required to be notified to the UE during execution of the Tracking Area Update processing, and in response to receiving the control signal, sends a response signal indicating that the Tracking Area Update processing is being executed to the PGW, and, after completion of the Tracking Area Update processing, causes the PGW to send the control signal to an MME that manages the location registration area of the UE after change.

(Supplementary Note 5)

An MME that, by movement of a UE, performs Tracking Area Update processing that changes a location registration area of the UE and manages the location registration area of the UE after change, wherein the MME receives a Downlink Data Notification message sent from an SGW during execution of the Tracking Area Update processing, and in response to receiving the Downlink Data Notification, activates a user plane setup procedure in conjunction with a Tracking Area Update Accept message to be sent to the UE.

An MME that, by movement of a UE, performs Tracking Area Update processing that changes a location registration area of the UE and manages the location registration area of the UE after change, wherein the MME receives a Downlink Data Notification message sent from an SGW during execution of the Tracking Area Update processing, and after holding the Downlink Data Notification message, sends a Tracking Area Update Accept message to the UE, receives a Tracking Area Update Complete message from the UE, and then performs paging processing to the UE in accordance with the Downlink Data Notification message.

(Supplementary Note 7)

A communication method in an MME that, by movement of a UE, performs Tracking Area Update processing that changes a location registration area of the UE and manages the location registration area of the UE before change, the method including receiving a control signal sent from a PGW and required to be notified to the UE during execution of the Tracking Area Update processing, in response to receiving the control signal, sending a response signal indicating that the Tracking Area Update processing is being executed to the PGW, and after completion of the Tracking Area Update processing, causing the PGW to send the control signal to an MME that manages the location registration area of the UE after change.

REFERENCE SIGNS LIST

10 BEARER MANAGEMENT DEVICE
11 INCOMING CALL CONTROL UNIT
15 OLD SGW
16 INCOMING CALL CONTROL UNIT
17 DATA ACCUMULATION UNIT
20 MOBILITY MANAGEMENT DEVICE
21 LOCATION REGISTRATION AREA
25 OLD MME
30 MOBILITY MANAGEMENT DEVICE
31 LOCATION REGISTRATION AREA
35 NEW MME
40 MOBILE TERMINAL DEVICE
45 UE
55 eNB
65 eNB
75 PGW
85 NEW SGW

The invention claimed is:

1. A method for a mobile communication system, the method comprising:
   initiating a TAU (Tracking Area Update) procedure with MME (Mobility Management Entity) change or an RAU (Routing Area Update) procedure with SGSN (Serving GPRS Support Node) change; and
   activating a user plane setup procedure in case a new MME or a new SGSN receives a DDN (Downlink Data Notification) message while a UE (User Equipment) is connected in the TAU procedure or the RAU procedure,
   wherein the user plane setup procedure is activated even if an active flag is not set in a TAU request message in the TAU procedure or an RAU request message in the RAU procedure.

2. The method according to claim 1, wherein
the DDN message is sent from an SGW (Serving Gateway) that received packets or a control signal for the UE to the new MME or the new SGSN.

3. The method according to claim 1, wherein
the user plane setup procedure is activated in conjunction with the TAU procedure or the RAU procedure.

4. The method according to claim 1,
wherein the new MME or the new SGSN identifies the UE without paging if the new MME or the new SGSN receives the DDN message while the UE is connected in the TAU procedure or the RAU procedure.

5. A mobile communication system comprising:
a UE (User Equipment); and
a plurality of MMEs (Mobility Management Entities) or a plurality of SGSNs (Serving GPRS Support Nodes);
wherein the UE is configured to initiate a TAU (Tracking Area Update) procedure with MME change or an RAU (Routing Area Update) procedure with SGSN change, and
wherein each of the plurality of MMEs or SGSNs is configured to activate a user plane setup procedure in case a new MME or a new SGSN receives a DDN (Downlink Data Notification) message while the UE is connected in the TAU procedure or the RAU procedure,
wherein each of the plurality of MMEs or SGSNs is configured to activate the user plane setup procedure even if an active flag is not set in a TAU request message in the TAU procedure or an RAU request message in the RAU procedure.

6. The mobile communication system according to claim 5, wherein
the DDN message is sent from an SGW (Serving Gateway) that received packets or a control signal for the UE to the new MME or the new SGSN.

7. The mobile communication system according to claim 5, wherein
the user plane setup procedure is activated in conjunction with the TAU procedure or the RAU procedure.

8. The mobile communication system according to claim 5,
wherein the new MME or the new SGSN identifies the UE without paging if the new MME or the new SGSN receives the DDN message while the UE is connected in the TAU procedure or the RAU procedure.

9. A communication method for a communication terminal used in a mobile communication system, the communication method comprising:
a step that the communication terminal initiates a TAU (Tracking Area Update) procedure with MME (Mobility Management Entity) change or an RAU (Routing Area Update) procedure with SGSN (Serving GPRS Support Node) change, and
a step that the communication terminal causes a user plane setup procedure to activate in case a new MME or a new SGSN receives a DDN (Downlink Data Notification) message while the communication terminal is connected in the TAU procedure or the RAU procedure, wherein the user plane setup procedure is activated even if an active flag is not set in a TAU request message in the TAU procedure or an RAU request message in the RAU procedure.

10. The communication method according to claim 9, wherein
the DDN message is sent from an SGW (Serving Gateway) that received packets or a control signal for the communication terminal to the new MME or the new SGSN.

11. The communication method according to claim 9, wherein
the user plane setup procedure is activated in conjunction with the TAU procedure or the RAU procedure.

12. The communication method according to claim 9, wherein the new MME or the new SGSN identifies the UE without paging if the new MME or the new SGSN receives the DDN message while the UE is connected in the TAU procedure or the RAU procedure.

* * * * *